May 29, 1923.
F. F. SORENSEN ET AL
1,457,091
MACHINE FOR CUTTING FILE TEETH ON CURVED SURFACES
Filed Oct. 15, 1920
6 Sheets-Sheet 4
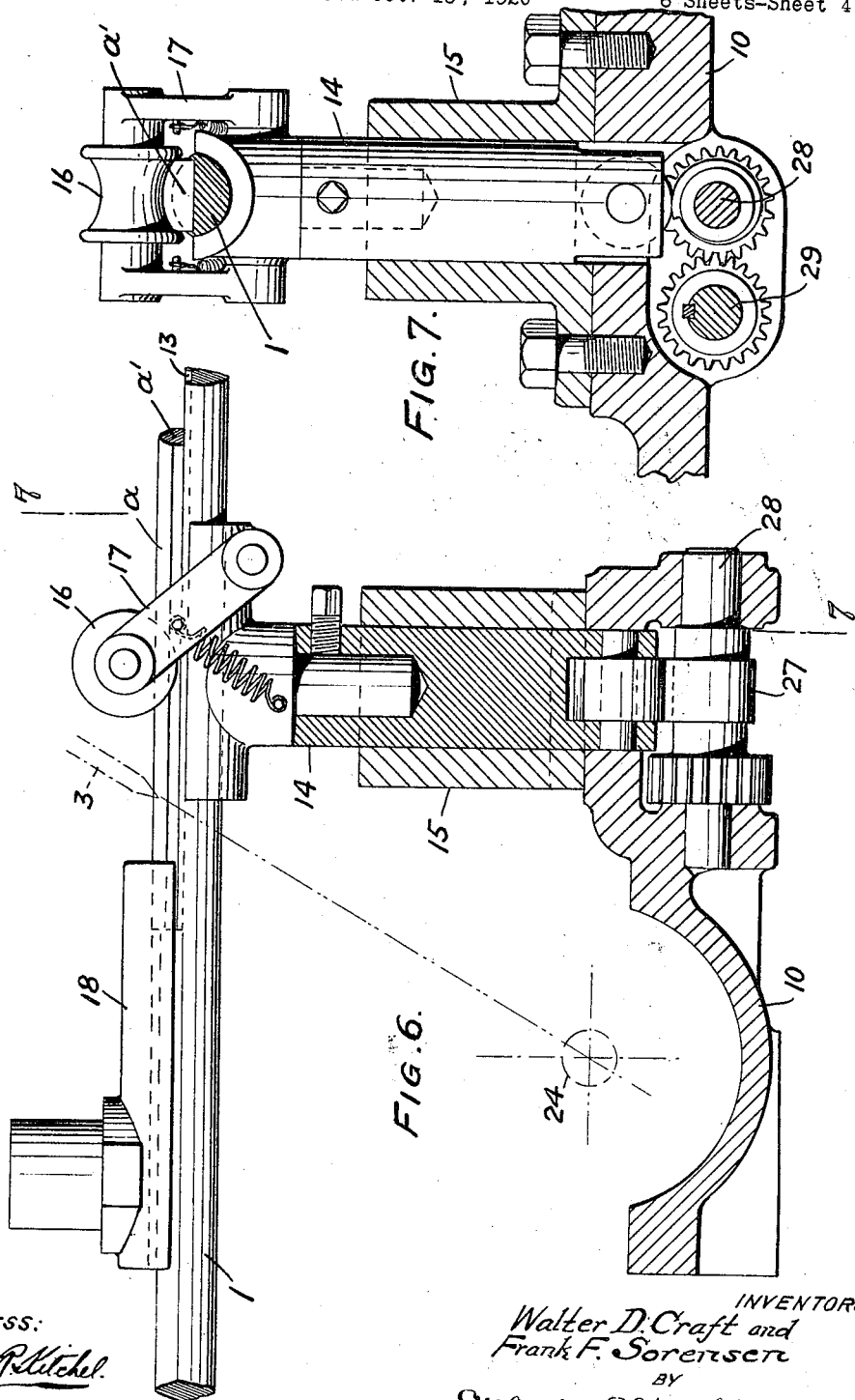
WITNESS:
INVENTORS
Walter D. Craft and
Frank F. Sorensen
BY
Augustus B Stoughton
ATTORNEY.

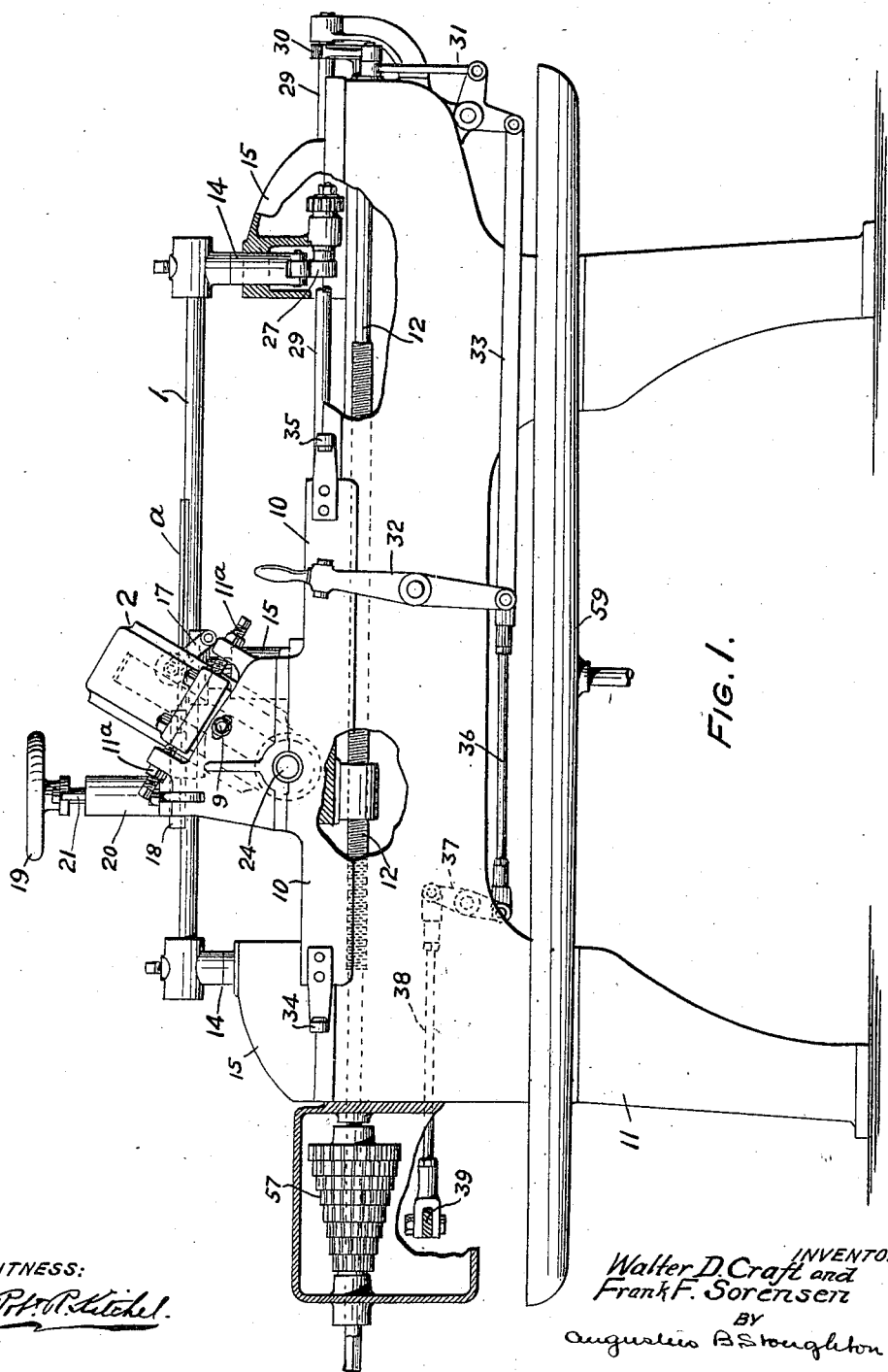

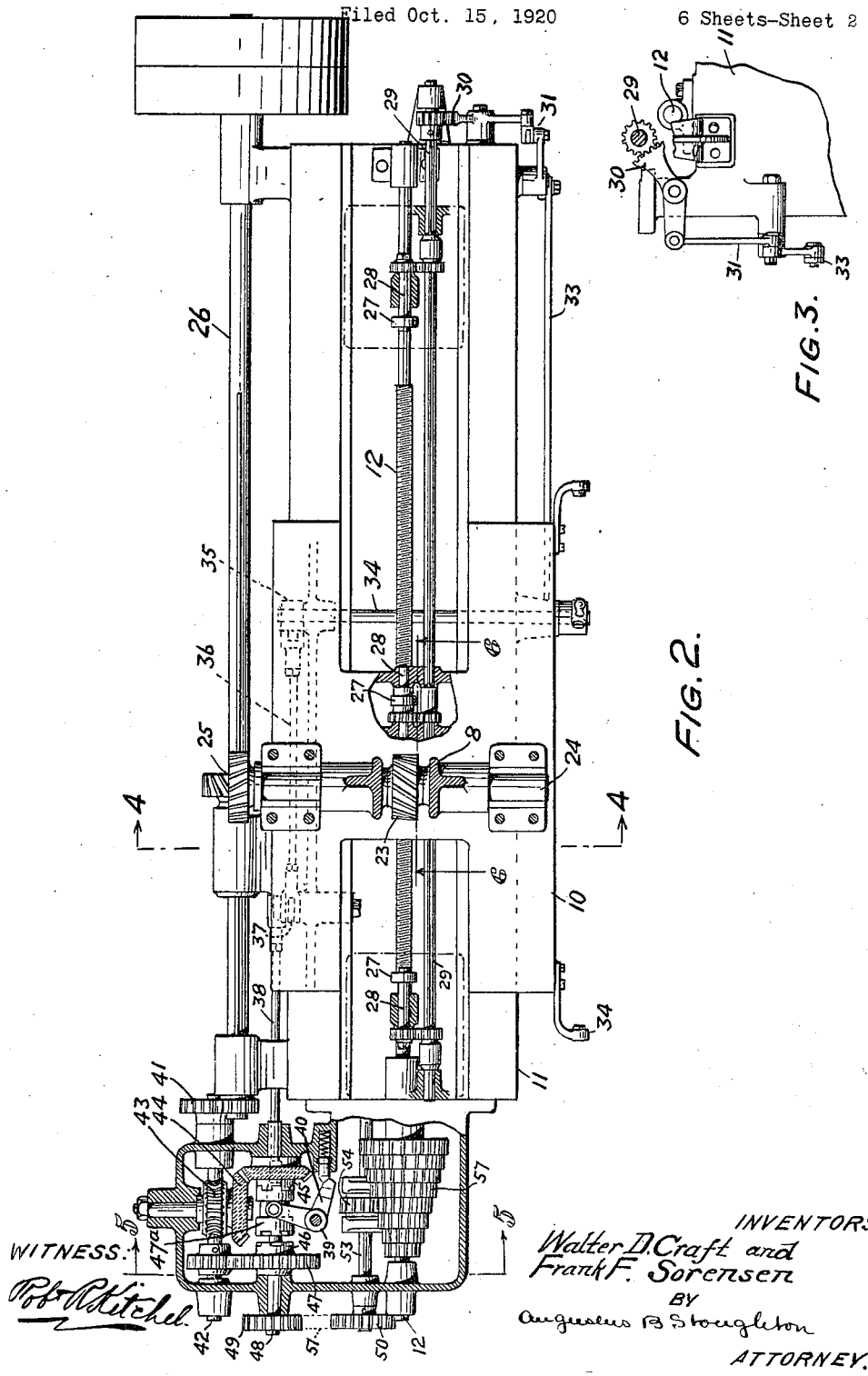

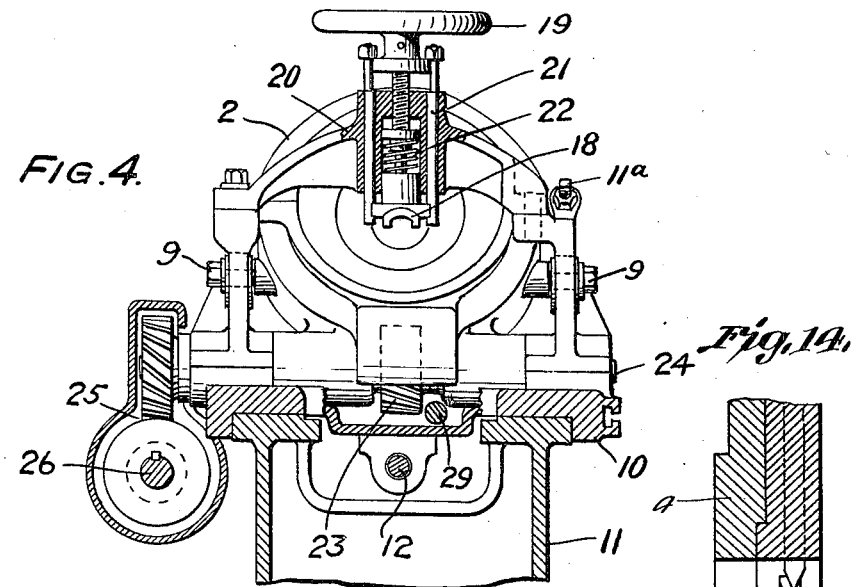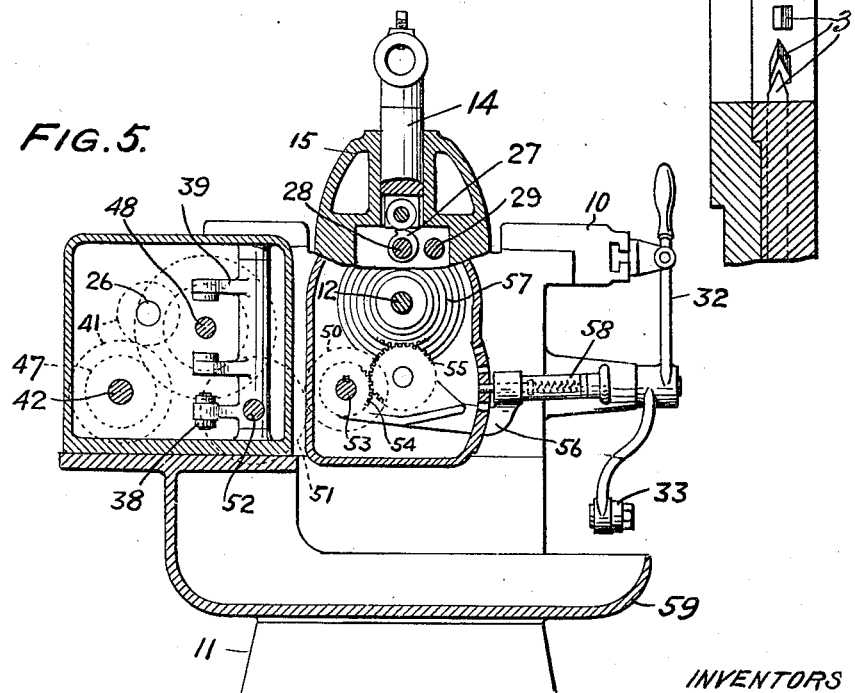

May 29, 1923.  1,457,091
F. F. SORENSEN ET AL
MACHINE FOR CUTTING FILE TEETH ON CURVED SURFACES
Filed Oct. 15, 1920    6 Sheets—Sheet 5
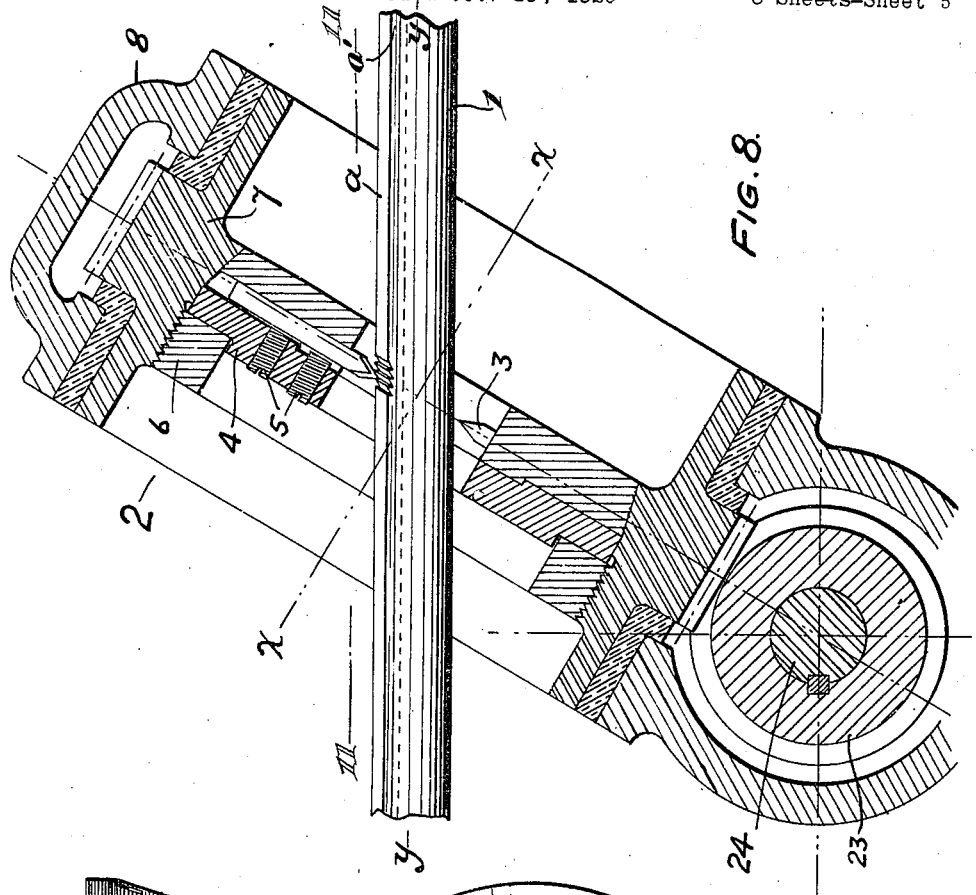
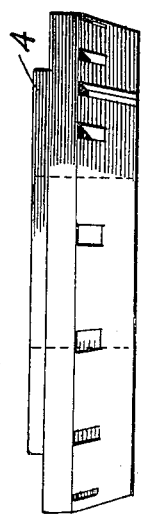
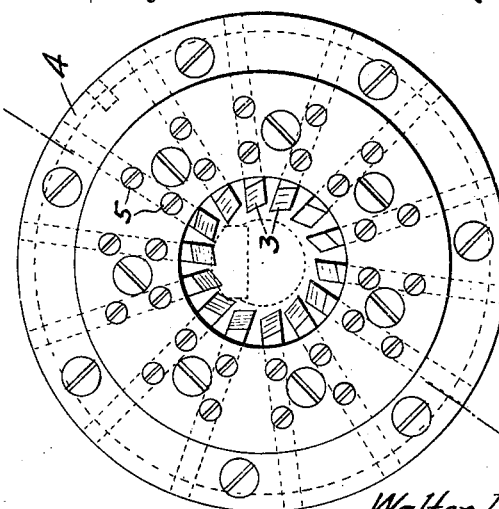
INVENTORS
Walter D. Craft and
Frank F. Sorensen
BY
Augustus B Stoughton
ATTORNEY.
WITNESS:

May 29, 1923.

F. F. SORENSEN ET AL 1,457,091

MACHINE FOR CUTTING FILE TEETH ON CURVED SURFACES

Filed Oct. 15, 1920   6 Sheets-Sheet 6

WITNESS:
Rob't R Kitchel.

INVENTORS
Walter D. Craft and
Frank F. Sorensen
BY
Augustus B S Foughton
ATTORNEY.

Patented May 29, 1923.

1,457,091

UNITED STATES PATENT OFFICE.

FRANK F. SORENSEN, OF PHILADELPHIA, PENNSYLVANIA, AND WALTER D. CRAFT, OF NEWARK, NEW JERSEY.

MACHINE FOR CUTTING FILE TEETH ON CURVED SURFACES.

Application filed October 15, 1920. Serial No. 417,165.

*To all whom it may concern:*

Be it known that we, FRANK F. SORENSEN and WALTER D. CRAFT, citizens of the United States, residing, respectively, at Philadelphia, in the county of Philadelphia and State of Pennsylvania, and at Newark, in the county of Essex and State of New Jersey, have jointly invented a new and useful Machine for Cutting File Teeth on Curved Surfaces, of which the following is a specification.

The principal object of the present invention is to provide means or mechanism for cutting or milling file teeth on the curved surfaces of files or file blanks thereby making it possible to commercially supply so-called half-round files with milled or cut file or undercut teeth on the half round faces which however are usually considerably less than half a circle in cross section. Another object of the invention is to provide for cutting or milling on curved surfaces file teeth of either arcuate or diagonal form. Another object of the invention is to provide a complete machine for cutting or milling file or undercut teeth on the half round faces of files which shall embody the mechanism or means of the invention. Other objects of the invention will appear from the following description:

Generally stated the invention comprises a carrier for holding a file blank and exposing its curved surface to the inwardly projecting teeth of a ring-cutter rotating around the blank about an axis inclined to the axis of the blank, and the invention further comprises the improvements to be presently described and finally claimed.

In the following description reference will be made to the accompanying drawings forming part hereof, and in which—

Figure 1, is a side elevation of a machine embodying features of the invention with parts broken away and parts omitted in order to show the feed and file detaching mechanisms.

Fig. 2, is a top plan view of the same with parts omitted and parts broken away in order to show the quick return and speed-change mechanism.

Fig. 3, is a fragmentary end elevation looking at the right hand end of Fig. 2, and showing clamp releasing mechanism.

Fig. 4, is a sectional elevational view, drawn to an enlarged scale and taken on the line 4—4 of Fig. 2.

Fig. 5, is a sectional elevation taken through the mechanism shown at the left-hand end on line 5—5 of Fig. 2, indicating certain gears in dotted lines.

Fig. 6, is a sectional view on line 6—6, Fig. 2, drawn to an enlarged scale, and showing a side elevation of a file clamp with other parts omitted.

Fig. 7, is a tranverse sectional view of Fig. 6 on line 7—7.

Fig. 8, is a sectional view taken on a line similar to Figure 6, i. e. 6—6 of Fig. 2 illustrating one form of internal ring cutter arranged for rotation about an axis inclined to the axis of a file carrier.

Fig. 9, is a face view of the cutter head detached.

Fig. 10, is a side view of the cutter head.

Fig. 14 is a section of the clamping ring on line 14—14, Fig. 9.

Figure 11:
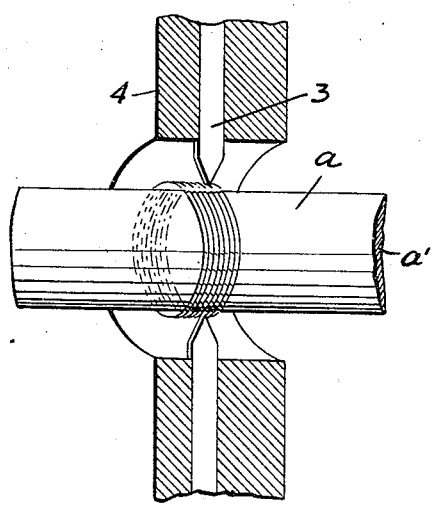
Figs. 11 and 12, are diagrammatic views illustrative of the milling or cutting of arcuate and diagonal teeth, the former as if taken on a line 11 of Fig. 8, and the latter a similar view of the form shown in Fig. 13.
Figure 12:
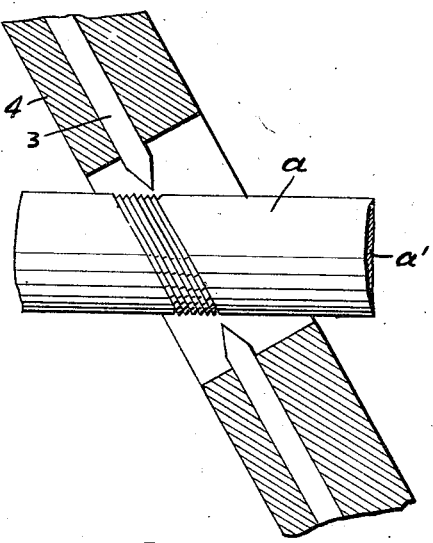

In the drawings, Fig. 8, 1 is a file carrier adapted to expose the curved surface $a$, of a file or file blank $a'$. 2, generally, is an internal ring cutter rotatable around the blank about an axis as $x$—$x$, inclined in respect to the axis $y$—$y$, of the file $a'$. In Fig. 8, the inclination of axes $x$—$x$, and $y$—$y$, is such that arcuate teeth are cut on the file as shown by the full spiral lines in Fig. 11. The inclination of the axes $x$—$x$ and $y$—$y$, may be different as shown by the position of the parts in Fig. 13, and in that case the teeth on the curved surface of the file are diagonal as shown in Fig. 12. In further explanation it may be said that in Fig. 11, the horizontal diameter of the ring cutter is at right angles to the axis of the file and the plane of the ring is inclined to the horizontal, so that arcuate teeth are cut at the top of the file, whereas in Fig. 12, the plane of the ring cutter is vertical in respect to the horizontal and the horizontal diameter of the ring is inclined to the axis of the file so that diagonal teeth are cut on the curved face of the file; in Fig. 11 the ring is tipped about a horizontal axis and in Fig. 12 it is tipped about a vertical axis. The tools or blades 3, extend progressively inward toward the center of the ring cutter, as shown in Figs. 9 and 14 and they are arranged in a spiral path as shown by the full and dotted lines in Fig. 11, and they make undercut or file teeth. As shown in Fig. 8, a clamping ring 4, provided with set screws 5, and a locking ring 6, serve to hold the tools 3, in the ring head 7. The ring head 7, or otherwise stated, the complete ring cutter 2, is revolubly mounted in a bearing 8, and is turned by means of worm wheel teeth provided on its periphery. The bearing 8, is hinged on shaft 24, Fig. 1, to a carriage 10, and is adjusted by means of adjusting screws 11ª, and clamped by a set screw 9, Fig. 1. The carriage 10, is slidably mounted upon a frame 11, and moved thereon by a feed screw 12. The file carrier 1, is grooved at 13, Figs. 6 and 7, for the reception of a file blank and it is movable vertically by means of posts 14, slidable up and down in brackets 15, fast on the frame, in order to permit of return movement of the carriage 10, with the cutter clear of the file. The file is held in the groove 13, by a spring pressed roller 16, mounted in a pivotal frame 17, Fig. 6, and by means of a clamp 18, Fig. 4, actuated by a hand wheel 19, mounted in a yoke 20, and raised by slidable rods 21, and pressed down through a spring 22. The cutter is driven through a tooth wheel 23, fast on a shaft 24, carried by the carriage and driven through worm gearing 25, splined to the drive shaft 26, Figs. 2, 4 and 8. The carrier 1, is raised and lowered by cams 27, mounted on short shafts 28, and acting on the posts 14, or more accurately on rollers carried thereby, Figs. 1, 2 and 6, and these short shafts are geared to a counter shaft 29. The shaft 29, is turned by a quadrant 30, Figs. 2 and 3, actuated through a link and lever mechanism 31, from the starting lever 32, Fig. 1, by a rod 33. Tappets or limit stops 34 and 35, on the carriage operate the hand lever 32. The hand lever 32, through a cross shaft 34, arm 35 (at back of machine) rod 36, lever 37, and rod 38, turns a clutch shipper 39, Fig. 5. This clutch shipper 39, is fitted with a spring plunger pressed arm 40, Fig. 2, so that its movements are quick and positive. The drive shaft 26, is geared at 41, to a counter shaft 42, which through worm gear 43, and bevel gear 44, drives the clutch element 45, in one direction and at a certain speed; the clutch element 46, being driven in the other direction and at a different speed from the counter shaft 43, through gearing 47. The movable clutch element 47ª, is shifted by the shipper 39, operated as described, so that the carriage is moved forward slowly and returned rapidly by the screw 12, which is driven from the shaft 48, to which the clutch element 47ª is splined. The shaft 48, through gears 49 and 50, and an idle gear 51 (diagrammatically shown in Fig. 2, and indicated in Fig. 5, as turnable about shaft 52) drives shaft 53, on which is slidably splined a gear 54, Fig. 5, which meshes with a gear 55; gears 54 and 55, are mounted on a swinging and slidable frame 56, so that any one of the set of gear wheels 57, fast on the feed screw can be used to drive it from gear 55, through gear 54, and shaft 53. In this way the speed of the feed can be adjusted by manipulating the lock handle 58. 59, is an oil catcher.

Figure 13:
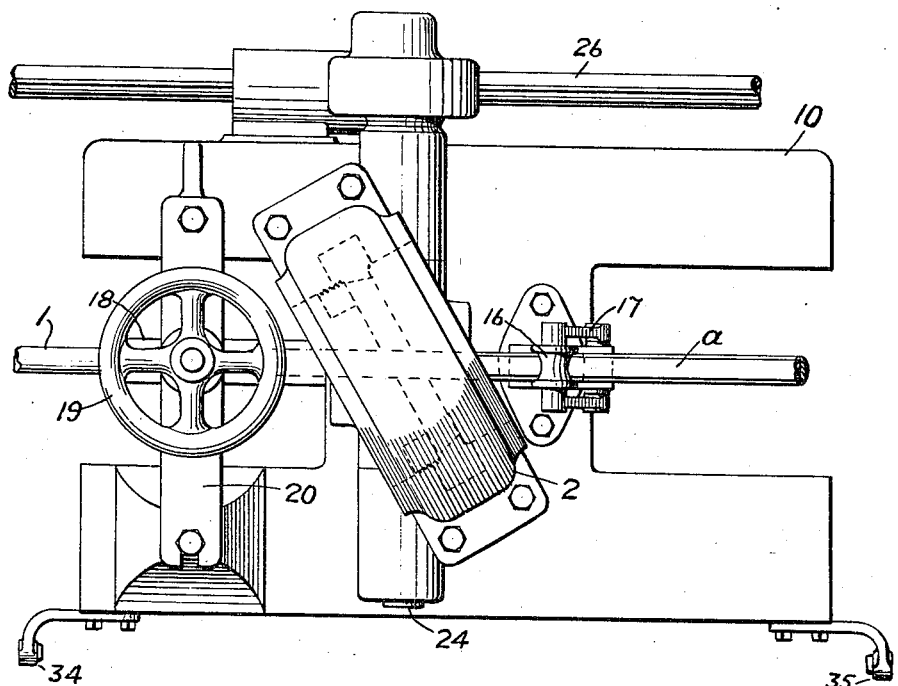
Fig. 13, is a partial plan illustrating a modification by which diagonal teeth are cut

In use a blank a′, is mounted on the carrier 1, by means of the described clamps, and the inclined internal ring cutter 2, while surrounding it is fed toward the left by the movement of the carriage 10, and mills on its curved surface a, either arcuate file teeth, Figs. 1 to 11, or diagonal file teeth, Figs. 12 and 13. The limit stop 34, operates the lever 32, causing the carrier 1, to be lowered through the described mechanism actuated by rod 33, and also causing the carriage to be returned through the action of the reverse gear controlled by rod 36, to the limit stop 35. The finished file is then removed and the operation repeated with other files.

Modifications may be obviously made in details of construction and arrangement without departing from the spirit of the invention which is not limited as to such matters or otherwise than as the prior art and the appended claims may require.

We claim:

1. A machine for cutting or milling file teeth on curved faces of files comprising the combination of a rotary internal ring cutter, a file blank carrier adapted to expose the curved face of a file blank through the cutter, means for relatively feeding the carrier and cutter, and provisions for rotating the cutter about an axis inclined to the axis of the file blank.

2. A machine for cutting or milling file teeth on curved faces of files comprising the combination of a revolving internal ring cutter, and means for relatively feeding a blank through the same in a direction inclined to the axis of rotation of the cutter.

3. A machine for cutting or milling file teeth on curved faces of files comprising the combination of a rotating internal ring cutter, and a file carrier, the axis of rotation of the cutter and the axis of the file carrier being inclined in respect to each other.

4. A machine for cutting or milling file teeth on curved faces of files comprising the combination of a rotating internal ring cutter having internally projecting teeth of progressively increasing lengths and disposed spirally in respect to the axis of the cutter, and a carrier for presenting the curved surface of the file blank through the cuttter to the cutter teeth, the axis of rotation of the cutter and the axis of the carrier being inclined in respect to each other.

5. A machine for cutting or milling file teeth on curved faces of files comprising the combination of means for holding a file blank in fixed position with its curved surface exposed, an internal ring cutter surrounding the blank and operating on its curved surface and arranged for rotation in a plane inclined to the axis of the blank, and means for feeding the cutter endwise of the blank.

6. A machine for cutting or milling file teeth on curved faces of files comprising the combination of a file carrier for holding a file blank with its curved surface exposed, an internally toothed ring cutter surrounding the blank and operative on its curved surface and arranged for rotation in a plane inclined to the axis of the blank, means for feeding the cutter endwise of the blank, and provisions for shifting the carrier in respect to the teeth of the cutter to clear the blank during retrograde movement of the cutter.

7. A machine for cutting or milling file teeth on curved faces of files comprising the combination of detachable holding means for a file blank, a rotating internal ring cutter surrounding the blank and arranged for operation at an inclination to the axis thereof, and means for relatively feeding the holding means and cutter, substantially as described.

8. A machine for cutting or milling file teeth on curved faces of files comprising the combination of holding means for a file blank, a head movable endwise of the blank, an inclined bearing hinged to the head, an internal ring cutter rotatable in the inclined bearing and surrounding the blank, means for rotating the cutter, and adjusting devices interposed between the head and bearing to vary the inclination of the cutter in respect to the axis of the blank.

FRANK F. SORENSEN.
WALTER D. CRAFT.